2,720,457

LEACHING OF METALLIC DEPOSITS

Felix Alfred Schaufelberger, Stamford, Conn., and Tuhin Kumar Roy, Elizabeth, N. J., assignors to Chemical Construction Corporation, New York, N. Y., a corporation of Delaware No Drawing. Application June 9, 1954,
Serial No. 435,623

3 Claims. (Cl. 75—119)

This invention relates to the treatment of elemental metal-bearing materials. More particularly, it relates to removing elemental cobalt deposited on reaction vessel surfaces during gaseous reduction of salt solutions thereof. Still more particularly, it relates to removing and recovering in an economically useful form such metallic deposits by subjecting the metal-bearing surfaces to the leaching action of an aqueous cobalt ammine solution.

The continued increasing demand for non-ferrous metals has been accompanied by a gradual depletion of high grade ore bodies. Accordingly, there has been extensive investigation into the treatment of low grade ores to extract the metals content thereof, particularly by hydrometallurgical processes. In general, such procedures involve initially leaching an ore or ore concentrate to dissolve the metal values. Pregnant leach solution is then treated in any of various ways to separate the metal values, usually as soluble salts. Aqueous solutions of the metallic salts may then be subjected to gaseous reduction at elevated temperatures and superatmospheric pressures to precipitate elemental powdered metal.

Although the above description is quite simply stated, the practice of such a hydrometallurgical procedure is considerably more involved. Particularly is this true with respect to gaseous reduction. One of the problems encountered in reduction is deposition on the reaction vessel surfaces of a part of the precipitated metal powder. Not only does this constitute a loss of powdered metallic product but it also necessitates frequent and extended shut downs of the reaction vessel to remove such deposited metal. By careful control of reaction conditions and the use of seed metal powder, such surface deposits may be substantially reduced. Nevertheless, even under optimum reduction conditions some metal deposits on the reaction vessel surfaces and must be removed periodically.

One method of removing such surface deposits involves opening of the reaction vessel and chipping off by hammering. This, however, not only involves time and expense, but the odd shaped pieces of metallic deposit so obtained are difficult to process to recover economically the metal content thereof.

A second and more satisfactory method of removing the metallic surface deposit is by chemical leaching. Both acid leaching and ammonia leaching have been employed with varying degrees of success. Although the former adequately leaches the deposit, it is a relatively expensive procedure, particularly where sulfuric acid is not used elsewhere in the metal recovery scheme. Moreover, this type of leach is difficult to conduct without corrosion of the stainless steel lined reaction vessel used for gaseous reduction.

An ammonia leach may be used with success when the deposited metal is nickel, but its use with cobalt is definitely limited. In the latter case, the insolubility of cobaltic oxide and cobaltic hexammine sulfate at low and high ammonia concentrations respectively, particularly at high leaching temperatures, and the slow leaching rate makes it difficult to obtain a pregnant solution having a cobalt concentration much greater than about 25 grams/liter.

There remains, therefore, a demand for a method of removing metallic deposits, particularly cobalt, formed on reaction vessel surfaces during gaseous reduction of metallic bearing liquors. Especially is there a demand for removing such metallic deposits by a chemical leaching method, thereby avoiding periodic opening of reaction vessels. Such a method should provide a leaching rate sufficiently high for a satisfactory leaching cycle and a minimum of shut down time for the vessel. It should be capable of providing a pregnant leach solution having a high concentration of the dissolved metal and in a form in which it may be recovered readily as high purity elemental metal. Such a method, moreover, should preferably involve the use of a liquor for leaching which is readily available from some other operation in the overall hydrometallurgical scheme.

It is the primary object of this invention to provide such a process. It is particularly an object of this invention to provide such a process for the removal of elemental metallic surface deposits formed during gaseous reduction of cobalt bearing liquors.

These objects have been met by a process which is surprisingly effective as well as being practical and economical in operation. In general, a description of the process of this invention may be quite simply stated. It involves subjecting elemental metal bearing surface deposits, formed during gaseous reduction of a cobalt bearing liquor to the leaching action of an aqueous cobaltic ammine liquor. Leaching is continued for time sufficient to substantially complete the reaction. Resultant pregnant leach liquor may then be treated by suitable means to recover the metal content thereof.

The cobaltic ammine leach liquor employed in accordance with this invention will generally be a sulfate liquor although other anions, such as nitrates, cyanide, and the like may be employed but not so conveniently. Such a liquor may be prepared by oxidizing a cobaltous sulfate solution whose ammonium sulfate and dissolved ammonia concentrations have been properly adjusted. Sufficient ammonium sulfate is made available to provide the necessary sulfate ions required by subsequent oxidation of cobalt.

Sufficient dissolved ammonia is provided for formation of a soluble cobalt ammine complex. Such an ammine complex may be represented by the formula $Co(NH_3)_x$ wherein $x$ may vary from about 2–6. The hexammine complex is formed in the presence of an excess of ammonia, which at elevated temperatures results in precipitation of insoluble cobaltic hexammine sulfate. It is desirable, therefore, to avoid excessively high ammonia concentrations. Oxidation of such an adjusted solution may then be conducted at room temperature with air, oxygen-enriched air or oxygen.

By cobalt "pentammine" solution as used throughout the instant specification and claims, is meant a solution having its cobalt content in soluble ammine complex form a substantial portion of which is as pentammine. Because such a leach liquor may very well be available from another operation of an overall hydrometallurgical procedure, the process of the present invention may be readily employed in conjunction therewith.

Where a leach liquor is not available as above-described and must be especially prepared, it is preferably accomplished by oxidizing an ammoniacal cobaltous sulfate-ammonium sulfate solution in the reaction vessel to be treated. At the same time, the leaching action is initiated. In this way the entire operation of preparing the leach liquor and initiating leaching may be accomplished as a single step.

The initial cobalt content of the solution may be quite widely varied. Thus, it may be as little as 5 grams per liter or as high as 60 grams per liter, or even more. There are, however, specific conditions of concentration which should be observed in order to obtain optimum leaching. For instance, at cobalt concentrations of about 60 grams per liter and higher the rate of reaction is extremely slow. On the other hand, while the reaction rate with leach liquors having a cobalt concentration of about 15 grams per liter and less is substantially faster, the amount of metallic deposit dissolved is not as high as desirable. In accordance with the process of this invention it has been found that optimum leaching is obtained with a solution having an initial cobalt concentration of about 20–30 grams per liter. At these initial concentrations it has been found that both the average leaching rate as well as the amount of metal dissolved are optimum.

When the cobalt content of the solution is initially in its cobaltous form, it may be oxidized as above described in the reaction vessel being treated by using an oxygen-bearing oxidizing gas such as oxygen, oxygen-enriched air or air. Preferably a partial pressure of oxygen should be maintained throughout leaching, even when the cobalt content is initially in its cabaltic form. In this way the cobaltous cobalt so formed by the leaching reaction is continually reoxidized and free to leach more cobalt deposit. While there is no limit on the oxygen partial pressure employed, pressures below about 100 p. s. i. g., generally in the range of about 30–75 p. s. i. g., will usually be found to be adequate.

Ammonium sulfate should be present in the leach liquor to discourage precipitation of cobalt oxides and hydroxides. It has been found that the most desirable ammonium sulfate concentration is about 150–200 grams/liter. As leaching proceeds and dissolved cobalt concentration increases, the cobalt ammine complex will necessarily have a lower ammonia content than that of the original cobalt content. It is desirable to have present sufficient free ammonia, generally about 70–95 grams/liter, to insure high ammine complexes of the dissolved cobalt content.

Leaching may be conducted at temperatures as high as 100° C. However, there is no advantage gained by operating at elevated temperatures over operating at substantially ambient temperatures. In general, optimum leaching can be conducted at temperatures ranging from about 40° C. to about 60° C.

One additional feature of this invention should be noted. Substantially nickel-free cobaltic ammine salt liquors obtained, for instance, by the separation method of the above noted copending application, are not amenable to reduction to elemental powder by known processes of gaseous reduction without first reducing the dissolved cobalt content to the cobaltous form. This lessens somewhat the attractiveness of this excellent cobalt-nickel separation procedure. It should be apparent, however, that when the process of this invention is used in conjunction with such a separation procedure, two objects are attained. First, metallic surface deposits are leached and, second, reduction of the cobaltic content of the liquor occurs. The process of this invention, therefore, provides an added advantage when used in conjunction with the above described cobalt-nickel separation procedure.

The following examples will further demonstrate the invention. These examples are illustrative only and not limiting. Unless otherwise noted, all parts are by weight. Example 1 illustrates for comparative purposes the use of an ammonia leach.

Example 1

A reaction vessel in which 50 batch gaseous reductions of cobalt-bearing liquors had been conducted at elevated temperatures and superatmospheric pressures to produce powdered elemental cobalt was subjected to the action of an ammonia-ammonium sulfate leach liquor to remove the elemental cobalt deposited on the vessel surfaces. The leach liquor comprised 8 grams/liter of ammonia and 200 grams/liter of ammonium sulfate. Leaching was conducted at 94° C. with an oxygen pressure of 50 p. s. i. g. After two hours the leach rate was determined to be 0.4 pound per square foot-day.

To demonstrate the efficacy of the process of the present invention, the following examples were run.

Example 2

Example 1 was repeated except the leach liquor was a cobaltic pentammine sulfate liquor having a cobalt concentration of 60 grams/liter and an initial pH of 9.3. The temperature was maintained at 100° C. and the leach liquor was exposed to the atmosphere during leaching. After a two hour period the leach rate was found to be 0.61 pound per square foot-day.

Example 3

Example 2 was repeated except the pH was maintained at about 2.7 by having present in the leach solution 54.5 grams/liter of sulfuric acid. After a two hour period the leach rate was determined to be 0.85 pound per square foot-day.

Example 4

The procedure of Example 2 was repeated except the leach liquor comprised 45 grams/liter cobalt, 200 grams/liter ammonium sulfate, 50 grams/liter ammonia. The pH was 8.6 and leaching temperature 50°–60° C. After two hours the leach rate was determined at 3.8 pounds per square foot-day.

Example 5

Example 4 was repeated except the cobalt content of the leach liquor was 30 grams/liter and a pressure of 50 p. s. i. g. of air was maintained. A leach rate of 7.5 pounds per square foot-day was determined after a two hour period.

Example 6

A cobaltous sulfate solution comprising 30 grams/liter cobalt, 167 grams/liter ammonium-sulfate and 93.5 grams/liter ammonia was introduced into a reaction vessel as in Example 1 and the temperature maintained at 50°–60° C. with an oxygen partial pressure of 50 p. s. i. g. After a 2 hour period the leach rate was determined at 16.4 pounds per square foot-day.

Example 7

Example 6 was repeated except the initial concentrations were cobalt 15 grams/liter, ammonium sulfate 134 grams/liter and ammonia 71.5 grams/liter. After two hours the leach rate was 5.5 pounds per square foot-day.

Example 8

Example 6 was again repeated except the initial concentrations of cobalt, ammonium sulfate and ammonia were 22.5 grams/liter, 151 grams/liter and 82.4 grams/liter respectively. After two hours the leach rate was determined to be 8.0 pounds per square foot-day.

We claim:

1. A method of treating reaction vessel surfaces to remove elemental cobalt deposited thereon during high temperature reduction of cobalt-bearing liquors which comprises introducing into said vessel a cobaltous ammine sulfate liquor having an initial composition of about 20–30 grams/liter cobalt, about 150–200 grams/liter ammonium sulfate and about 70–95 grams/liter free ammonia, maintaining a temperature of about 40°–60° C. and oxygen partial pressure of about 30–75 p. s. i. g., and continuing treatment for time sufficient to substantially dissolve the elemental cobalt content of said deposit.

2. A method of treating reaction vessel surfaces to remove elemental cobalt deposited thereon during high temperature reduction of cobalt-bearing liquors which comprises introducing into said vessel a cobalt ammine sulfate liquor having an initial composition of about 5–60 grams/liter cobalt, 150–200 grams/liter ammonium sulfate and about 70–95 grams/liter free ammonia, maintaining a temperature not greater than about 100° C. and continuing treatment for time sufficient to substantially dissolve the elemental cobalt content of said deposit.

3. A process according to claim 2 in which the initial cobalt content is cobaltic and is about 20–30 grams/liter and a temperature of about 40–60° C. and an oxygen partial pressure of about 30–75 p. s. i. g. is maintained.

References Cited in the file of this patent

UNITED STATES PATENTS

| | | |
|---|---|---|
| 2,400,115 | Hills et al. | May 14, 1946 |
| 2,647,820 | Forward | Aug. 4, 1953 |
| 2,647,828 | McGauley | Aug. 4, 1953 |